United States Patent [19]

Hatz

[11] 4,141,422
[45] Feb. 27, 1979

[54] VEHICLE, IN PARTICULAR TRACTOR

[75] Inventor: Ernst Hatz, Ruhstorf, Fed. Rep. of Germany

[73] Assignee: Motorenfabrik Hatz GmbH & Co. KG, Ruhstorf, Fed. Rep. of Germany

[21] Appl. No.: 823,491

[22] Filed: Aug. 10, 1977

[30] Foreign Application Priority Data

Aug. 26, 1976 [DE] Fed. Rep. of Germany ....... 2638567

[51] Int. Cl.² ...................... B62D 25/08; B62D 49/00
[52] U.S. Cl. ..................................... 180/1 F; 280/111
[58] Field of Search .................. 180/1 F, 41; 280/111, 280/112 R

[56] References Cited

U.S. PATENT DOCUMENTS 2,327,850   8/1943   Baker et al. ........................... 280/111
3,448,992   6/1969   Wilfert et al. ......................... 280/112

FOREIGN PATENT DOCUMENTS 931331   8/1955   Fed. Rep. of Germany .......... 280/111

Primary Examiner—Joseph F. Peters, Jr.
Assistant Examiner—Donn McGiehan
Attorney, Agent, or Firm—Blanchard, Flynn, Thiel, Boutell & Tanis

[57] ABSTRACT

A vehicle having a front axle wherein the axle is divided into halves with each half being pivotally supported on a common pivot pin. The pivot pin is mounted at one end to the driving engine and at the other end to a plate which is supported in position by a pair of rod-shaped force transmitting members which are connected to and supported from the driving engine. The force transmitting members effect a reduction in the magnitude of the forces applied to the pivot pin so that the housing structure for the driving engine can be reduced in size and weight.

7 Claims, 6 Drawing Figures

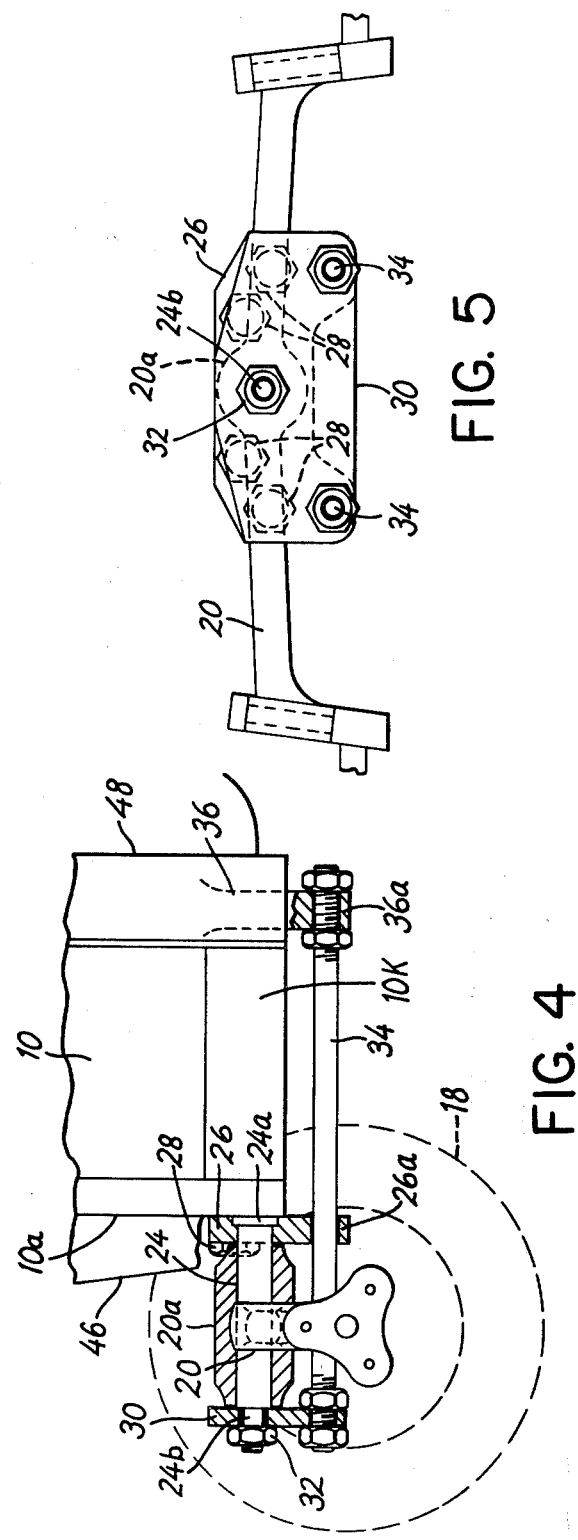

VEHICLE, IN PARTICULAR TRACTOR

FIELD OF THE INVENTION

The invention relates to a vehicle, in particular a farm tractor, having front and rear wheels which are mounted on axles and the front axle is arranged movably about a horizontally extending pivot pin.

BACKGROUND OF THE INVENTION

In such arrangements of the front axle, it often happens that during driving over obstacles, for example curbs, or during front-loading operations, a sudden, large torque is transmitted from the front wheels onto the axle and from same in turn onto the bearing plate of the pivot pin, which bearing plate is secured to the crankcase housing. Therefore, it was necessary in known arrangements to use a crankcase housing which for this purpose was especially reinforced or very large support surfaces for the bearing plate in order to prevent a breaking out of a screwed-on part on the bearing plate from the housing of the driving engine. Such arrangements are, however, disadvantageous. On the one hand a reinforcement or stiffening of the crankcase housing requires practically a special type of driving engine and on the other hand the mounting of large support surfaces on a driving engine encounters particularly great difficulties with respect to manufacture and structure.

The purpose of the present invention is to avoid these disadvantages and to produce a suspension for the front axle of the vehicle, which prevents a transmission of torques onto the bearing part which carries the front axle on the machine and requires only very small support surfaces on the front wall of the driving engine. This purpose is inventively attained by supporting one end of the pivot pin in a bearing plate secured to the driving engine or on a front wall of the driving engine, which front wall extends behind the bearing plate and a front member being positioned on the other end of the pivot pin, to which in turn are secured the ends of at least two rod-shaped transmitting members, each of which extends through a guide bore in the bearing plate and is rigidly connected at the other end with a vehicle-fixed bearing projection. Due to this inventive type of axle support, it is possible to use, for driving the vehicle, internal combustion engines having a weaker housing (for example small-volume passenger car diesel motors), because from the front axle onto the crankcase housing, torques are not transmitted but instead only pushing forces which are absorbed without any difficulties by the fastening screws of the bearing plate on the housing of the driving engine. The pull and/or pressure forces which occur for example during a coupling of a tractor wagon to a coupling element on the front plate can also be diverted entirely or partly through the transmitting members, so that also in the case of weaker housing constructions said forces can be absorbed without any difficulties. According to a preferred embodiment of the invention, the transmitting members are constructed as round rods and the front member as a front plate, so that through screw threads at the ends of the round rods their connection to the front plate and the bearing projections can be carried out in a very simple manner. Furthermore, its round cross section results in a certain elasticity which is very desirous for transmitting the forces.

The vehicle-fixed anchoring of the transmitting members can be defined by the bearing projection being constructed as a projecting flange on the housing of the driving engine itself. For this purpose, it is for example possible to construct the exchangeable flywheel housing in one piece with the bearing projection. However, it is also possible that a projecting flange be formed on the housing of the vehicle gearing to define the bearing projection. Thus depending on the type of construction, it is possible to place the bearing projection, thus the anchorage point of the transmitting members on each suitable vehicle-fixed point.

According to a different embodiment of the invention, vibration damping inserts, for example hard-rubber sleeves, are inserted on the joints of the front axle suspension. This type brings about the further advantage that not only the members of the axle suspension itself, but also further elements which are secured on said members or are supported by them are body-sound-insulated. This is true for example for both the additional weights (center or front weights) which are suspended on the transmitting members, and also for fenders, attachments and others.

When driving engines are used which are fully surrounded with a casing for the purpose of sound absorption, according to a special characteristic of the invention the arrangement is made such that only the parts of the bearing plate, which parts are needed for the manufacture of the connection and the bearing projections are guided out of the casing and are sealed off against the casing.

BRIEF DESCRIPTION OF THE DRAWINGS

Some exemplary embodiments of the invention are discussed more in detail in the following description with reference to the drawings, in which:

FIGS. 4 and 5 illustrate some details of the suspension in an enlarged scale.

DETAILED DESCRIPTION

Figure 1:
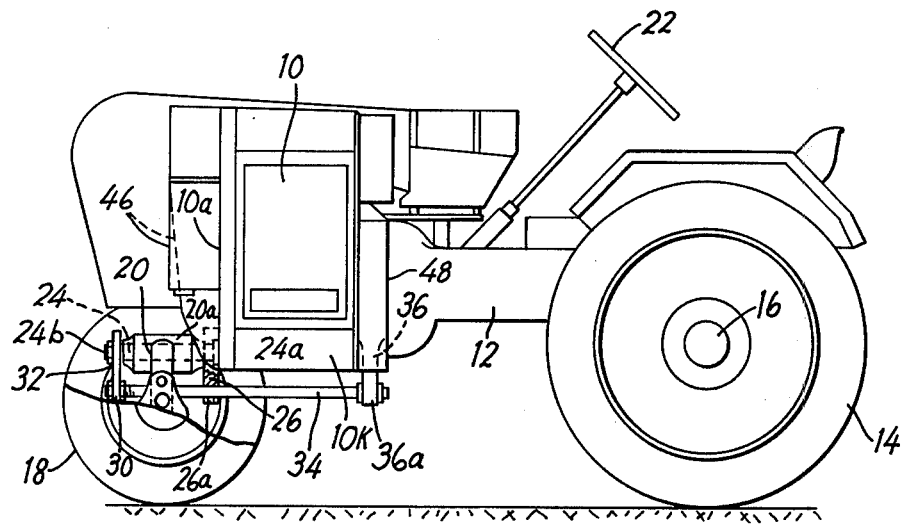
FIG. 1 is a side view of a tractor having a front axle suspension.
Figure 2:
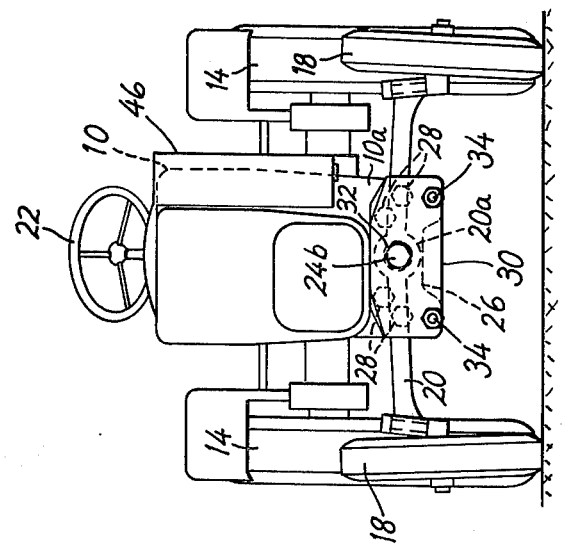
FIG. 2 is a front view of FIG. 1.

A farm tractor of a known type is illustrated in FIGS. 1 and 2 and has a driving engine 10 and a transmission 12. Two driven rear wheels 14 are mounted on a rear axle 16, which is secured to a not illustrated vehicle frame. Two front wheels 18 are supported on a front axle 20. A steering mechanism which is controlled by a steering wheel 22 and which is known and therefore not illustrated is used for adjusting the front wheels with respect to the front axle and thus control the direction change during driving. The drive means for the differential, which drive means extend from the transmission 12 rearwardly to the rear axle and the coupling means for the tractor wagon or the like, which coupling means are mounted between the rear wheels are not illustrated for the purpose of simplicity.

The front axle 20 is — as this is particularly clearly shown in FIGS. 4 and 5 — rotationally movably supported about a pivot pin 24 which extends parallel to the longitudinal axis of the tractor. A head 24a on the pivot pin is surrounded by a bearing plate 26 which is fixedly secured by a plurality of fastening screws 28 to the front side wall 10a of the crankcase housing 10k of the driving engine 10. The hub 20a of the front axle 20 is rotationally supported for movement about the axis of the pivot pin 24 and is held in fixed axial relation by means of a front plate 30 and a nut 32 which engages the threaded shank end 24b of the pivot pin 24. The bearing plate 26 and front plate 30 are positioned as is illustrated equidistant from an imaginary plane extending through the front axle.

Two round rods 34 which serve as transmitting members are arranged below and parallel to the pivot pin 24. Each rod 34 has a thread at their opposite ends and extends, intermediate the ends, with little clearance through a bore 26a in the bearing plate 26. The rod 34 is connected at one end to the front plate 30 and at the other end to a bearing projection 36a which is rigidly mounted on the flywheel housing 36.

In the case of this jointlike suspension of the front axle, each force which acts through the hub 20a onto the pivot pin 24 is split up or halved into two equal components due to the described arrangement by acting onto the front plate 30 and onto the bearing plate 26. The component which acts onto the front plate 30 is thereby absorbed by the housing 36 and the bearing plate 26 due to the interposed rods 34. Only pressure or pull forces act hereby onto the plate 26, which forces are transmitted by the rods 34 in the openings 26a onto the plate 26. Also the other force component which acts onto the bearing plate 26 through the pivot pin 24 is applied only as a pressure or pull force and is not applied as a torque.

Therefore, torsional forces do not act onto the front wall 10a of the crankcase housing 10k, as such forces would attempt to tear the fastening screws 28 with the bearing plate 26 from the wall 10a. The pushing forces which occur on the bearing plate 26 can particularly be applied without any difficulties in the case of weaker crankcase housing front walls. Thus this arrangement produces with simple structural elements a safe and space-saving suspension of the front axle of the vehicle. Thus this suspension can for example also be used in diesel motors of passenger cars having weaker crankcase housings and such motors can be used as driving engines in vehicles of the discussed type.

Figure 3:
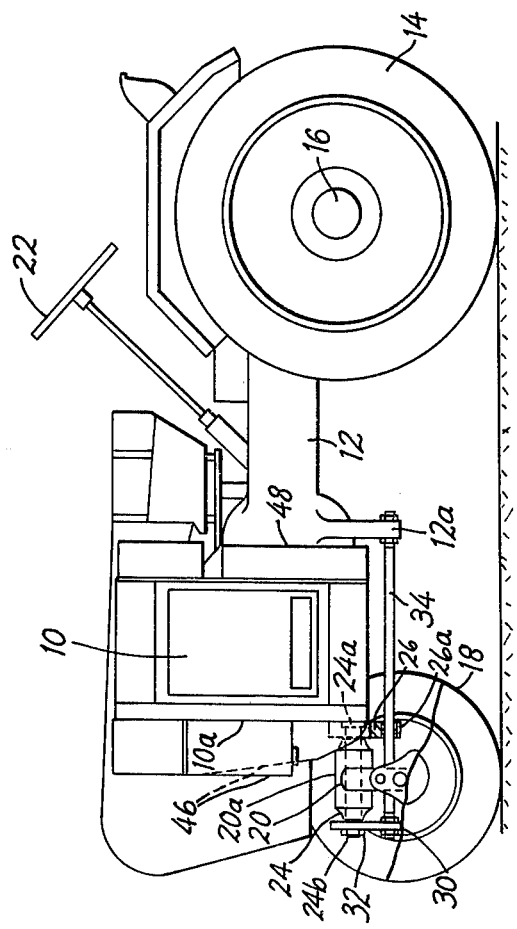
FIG. 3 is a different kind of the axle suspension.

FIG. 3 illustrates that the rear anchorage point for the rods 34 are each formed by a bearing projection 12a on the transmission housing 12. In this manner, the rods 34 direct the resulting forces directly onto the strong structure of the housing 12 to bring about a further relief from undesired force actions on the crankcase housing and the driving engine.

Figure 6:
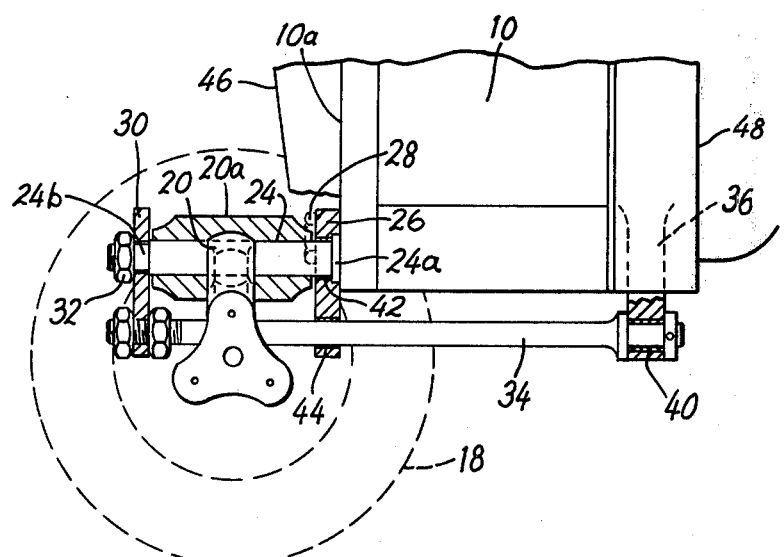
FIG. 6 illustrates some details of a different suspension also in an enlarged scale.

From FIGS. 1 and 3 one can see that the illustrated driving engine is surrounded entirely with a casing 46, 48 for the purpose of damping noises. The construction of such a casing is discussed more in detail for example in U.S. Pat. No. 3,924,597, so that such details are not discussed in detail here. It must only be pointed out that — as shown in FIG. 6 — the parts of the suspension of the front axle, namely the bearing plate 26 and the housing 36 which are positioned directly on the engine walls, project from this casing 46, 48 and are sealed off with respect to it. Moreover, hard-rubber sleeves 40 are inserted as damping means between the rods 34 and the bearing projections 36. Further hard-rubber sleeves 42 or 44 are inserted also between the bearing plate 26 and the pivot pin 24 and the rods 34. In this manner, vibrations which come from the body of the driving engine during the operation thereof will be prevented from being transmitted onto the members of the front axle suspension. This vibration insulation brings about also the advantage that further elements which are secured on these members or are supported by them are also body-sound-insulated. This is true for example for the additional weights which are suspended on the transmitting members, for the fenders which are associated with the wheels or the attachments which are moved by the front axle suspension through coupling means.

It is further mentioned that the discussed types of construction illustrate only some exemplary embodiments while the scope of the invention permits also other possibilities of construction. For example it would be possible to have the wall 10a of the crank housing 10k, which wall extends behind the bearing plate 26, also directly receive the head 24a of the pivot pin 24. In addition, the two transmitting rods 34 could form a one-piece U-shaped member and the pivot pin could engage directly the connecting web of this U-shaped member. It would also be conceivable to use as a bearing plate a cast-on part of the crankcase housing. Finally a construction is also possible in which the two transmitting rods are continued to the rear wheels and are supported here in vehicle-fixed supports. In such a type of construction it could then be possible to utilize the transmitting rods for a body-sound-insulated mounting of rear wheel fenders, tractor floor plates, stepping plates, driver's cabin and/or attachments.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows: I claim:

1. In a vehicle having a driving engine, in particular a tractor having front and rear wheels which are mounted on front and rear axles respectively, wherein the front axle is arranged movably about a horizontally positioned pivot pin, the improvement comprising wherein the one end of the pivot pin is supported in a bearing plate which is secured on a front wall of the driving engine, which front wall extends behind the bearing plate, and a front member is positioned at the other end of the pivot pin, with which front member are connected the ends of at least two rod-shaped force transmitting members, each of which extends through a guide bore in the bearing plate and is rigidly connected at the other end with a vehicle-fixed bearing projection.

2. The improved vehicle according to claim 1, wherein the force transmitting members are constructed as round rods and the front member as a front plate.

3. The improved vehicle according to claim 1, wherein the driving engine has a housing and each bearing projection is constructed as a projecting flange on the housing of the driving engine.

4. The improved vehicle according to claim 1, wherein the vehicle has a transmission and a housing therefor and each bearing projection is constructed as a projecting flange on the housing of the vehicle transmission.

5. The improved vehicle according to claim 1, wherein vibration damping inserts are provided between the pivot pin and the bearing plate and between the force transmitting members and the bearing plate and the bearing projections.

6. The improved vehicle according to claim 5, wherein the inserts are constructed as hard-rubber sleeves.

7. The improved vehicle according to claim 1, wherein the driving engine is surrounded entirely with a casing for the purpose of sound damping and the bearing plate and the bearing projections project from the casing.

* * * * *